(12) United States Patent
Kapinos et al.

(10) Patent No.: US 12,437,051 B2
(45) Date of Patent: Oct. 7, 2025

(54) DEVICE AUTHENTICATION UTILIZING SENSOR TRIGGER AREAS

(71) Applicant: Lenovo (Singapore) Pte. Ltd., Singapore (SG)

(72) Inventors: Robert J. Kapinos, Durham, NC (US); Scott Li, Cary, NC (US); Robert James Norton, Jr., Raleigh, NC (US); Russell S. VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 255 days.

(21) Appl. No.: 18/194,317

(22) Filed: Mar. 31, 2023

(65) Prior Publication Data

US 2024/0330429 A1    Oct. 3, 2024

(51) Int. Cl.
*G06F 21/62* (2013.01)
*G06F 21/33* (2013.01)
*G06F 21/44* (2013.01)

(52) U.S. Cl.
CPC ............ *G06F 21/44* (2013.01); *G06F 21/335* (2013.01); *G06F 21/6227* (2013.01)

(58) Field of Classification Search
CPC ............ H04N 21/4367; H04L 63/0884; H04L 67/306; H04L 63/10; H04L 63/101; H04L 63/102; H04L 63/105; H04L 63/107; G06F 21/44; G06F 21/445; G06F 21/60; G06F 21/62; G06F 21/6209; G06F 21/6218; G06F 21/6245; H04W 12/08; H04W 12/37
See application file for complete search history.

(56) References Cited

U.S. PATENT DOCUMENTS

| 2017/0195879 A1* | 7/2017 | Jones-McFadden ... G06Q 20/36 |
| 2021/0058105 A1* | 2/2021 | Landry ................. H04W 12/08 |
| 2021/0368316 A1* | 11/2021 | Tiwari .................. G06Q 20/20 |

\* cited by examiner

*Primary Examiner* — Malcolm Cribbs
(74) *Attorney, Agent, or Firm* — FERENCE & ASSOCIATES LLC

(57) ABSTRACT

The system and method provide a technique for providing an information handling device with increased access to secure data by detecting the location of an information handling device on a surface in relation to at least one sensor located within the physical surface, and determining that the information handling device is an authenticated device based upon a communication between the at least one sensor and the information handling device. An orientation of the at least one sensor(s) present in the physical surface, or a sensor trigger area of the physical surface, may align with previously associated sensors coupled to the information handling device. Subsequent to determining the position of the sensors coupled to the device aligns with the at least one sensor trigger area, the information handling device may be authenticated which results in increased access to the device.

20 Claims, 4 Drawing Sheets

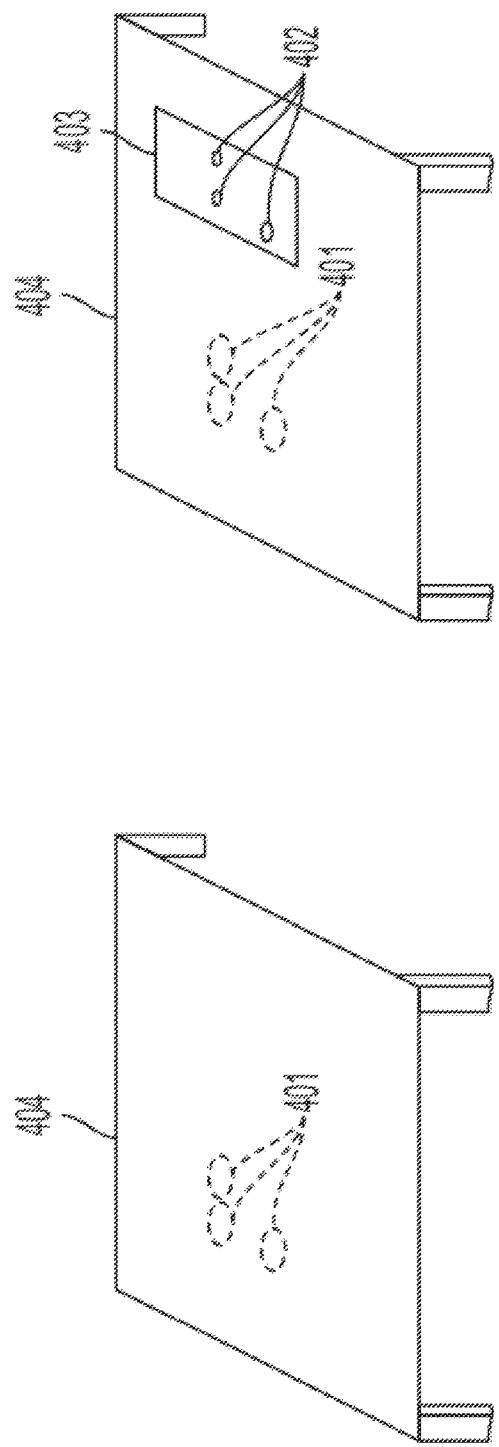
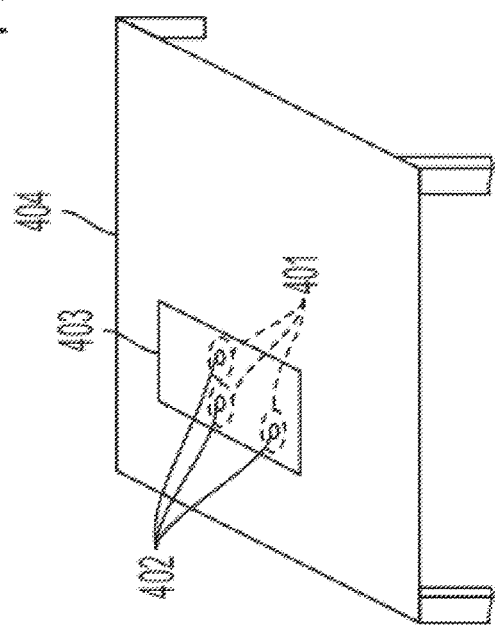
FIG. 4A
FIG. 4B
FIG. 4C

DEVICE AUTHENTICATION UTILIZING SENSOR TRIGGER AREAS

BACKGROUND

Accessing secure data from a remote location commonly requires authentication of the user and/or the device prior to being granted permission to view such data. Based upon previously identified permissions for the data, different authentication methods may be utilized to ensure that secure information does not become compromised. Different authentication methods may be simple, such as providing certain credentials, or may be more complex such as multi-step authentication methods. The authentication method that is utilized may be dependent on the security of the data that is being accessed.

BRIEF SUMMARY

In summary, one aspect provides a method, the method including: detecting, utilizing at least one sensor located within a physical surface, an information handling device located proximate to the physical surface; determining, based upon a communication of the at least one sensor to the information handling device responsive to the detecting, the information handling device is an authenticated device; and providing, responsive to the determining the information handling device is an authenticated device, the information handling device increased access.

Another aspect provides a system, the system including: a processor; at least one sensor located within a physical surface; a memory device that stores instructions that when executed by the processor, causes the system to: detect, utilizing the at least one sensor, an information handling device located proximate to the physical surface; determine, based upon a communication of the at least one sensor to the information handling device responsive to the detecting, the information handling device is an authenticated device; and provide, responsive to the determining the information handling device is an authenticated device, the information handling device increased access.

A further aspect provides a product, the product including: a computer-readable storage device that stores executable code that, when executed by a processor, causes the product to: detect, utilizing at least one sensor located within a physical surface, an information handling device located proximate to the physical surface; determine, based upon a communication of the at least one sensor to the information handling device responsive to the detecting, the information handling device is an authenticated device; and provide, responsive to the determining the information handling device is an authenticated device, the information handling device increased access.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4A illustrates an example of a physical surface with a plurality of sensor trigger areas.

FIG. 4B illustrates an example of a device incorrectly aligned with the sensor trigger areas of FIG. 4A.

FIG. 4C illustrates an example of a device correctly aligned with the sensor trigger areas of FIG. 4A.

DETAILED DESCRIPTION

Figure 1:
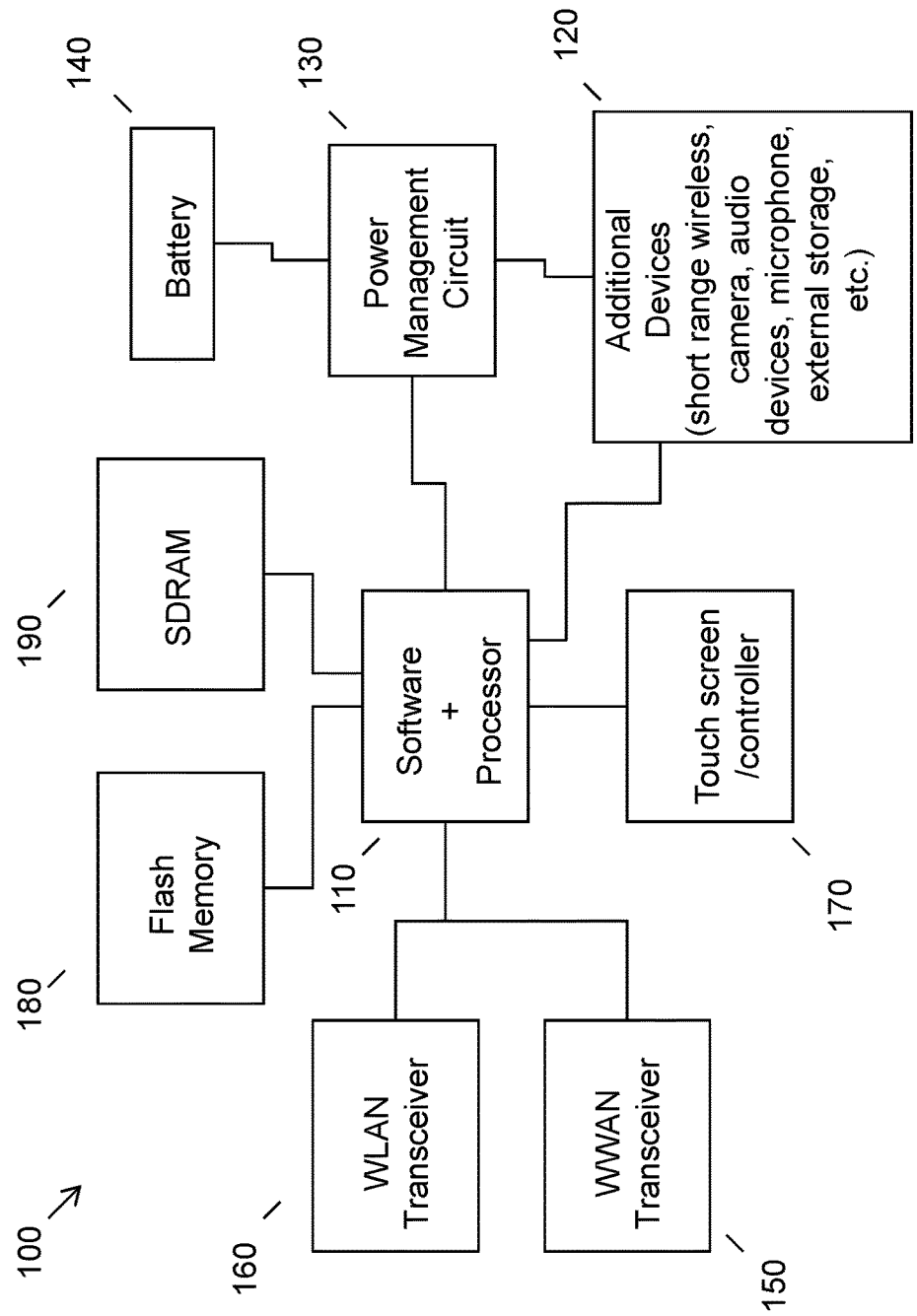
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Accessing secure data generally requires authenticating either a user or a device being used to view the secure data. Authenticating a device includes establishing a relationship between a device and a data store storing the secure data. Once the device is authenticated the device is allowed access to the secure data. Authenticating the device may also identify restrictions around accessing secure data, for example, based upon authentication level, security clearance of the person accessing the secure data, and/or the like. Thus, not all authenticated devices and/or users may have the same level of access to secure data. It is common to allow access to secure data from a location that is remote from the location of the server, datastore, device, and/or the like, which houses the data. Thus, this remote access generally requires authenticating and thereafter, tracking a device that is accessing the secure data. By allowing remote access to secure data, a window of opportunity for the secure data to become compromised by a device or user gaining unauthorized access to secure data becomes available. Thus, minimizing wireless network prevalence may assist with keeping data safe and secure.

In conventional methods for authenticating while attempting to minimize reliance solely on wireless network access, a system may utilize location information associated with an information handling device attempting to access secure data. These conventional methods may utilize location data in a broad form. For example, some successful authentications may be based upon an information handling device being present on a particular network which is associated with a particular location. As another example, successful authentication may be based upon the information handling device being present in a secure location with in a building (e.g., floor, office, etc.). These traditional location methods for authentication may permit a level of authentication and loosely act as a security measure. However, large areas for secured connectivity or a simple presence on a network may not be enough for some authentication desires. What is needed is a more specific location determination method for a device that results in successful authentication to ensure that the secure data does not become comprised. Further, a limit to accessing such secure data will further increase a security protocol of a system. Thus, requiring a type of authentication that relies on authenticating a device based upon a physical location of the device may assist with keeping data safe and secure.

Accordingly, the described system and method provides a technique for providing an information handling device with increased access to secure data by detecting the location of an information handling device on a surface in relation to at least one sensor located within the physical surface, and determining that the information handling device is an authenticated device based upon a communication between the at least one sensor and the information handling device. An orientation of the at least one sensor(s) present in the physical surface, or a sensor trigger area of the physical surface, may align with previously associated sensors coupled to the information handling device. Subsequent to determining the position of the sensors coupled to the device aligns with the at least one sensor trigger area, the information handling device may be authenticated which results in increased access to the device.

Such a system provides a user with access to secure data after authenticating the information handing device attempting to access the data. Since authenticating the information handling device includes identifying a positioning the information handling device on a surface containing at least one sensor embedded within the surface, a more secure authentication technique is provided. Upon determining the correct position of the information handling device and thereafter, authenticating the information handling device, a authentication system may produce an authentication token for the information handling device, thereby allowing the device increased access, for example, increased security clearance, access to secure information, access to different applications, and/or the like.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
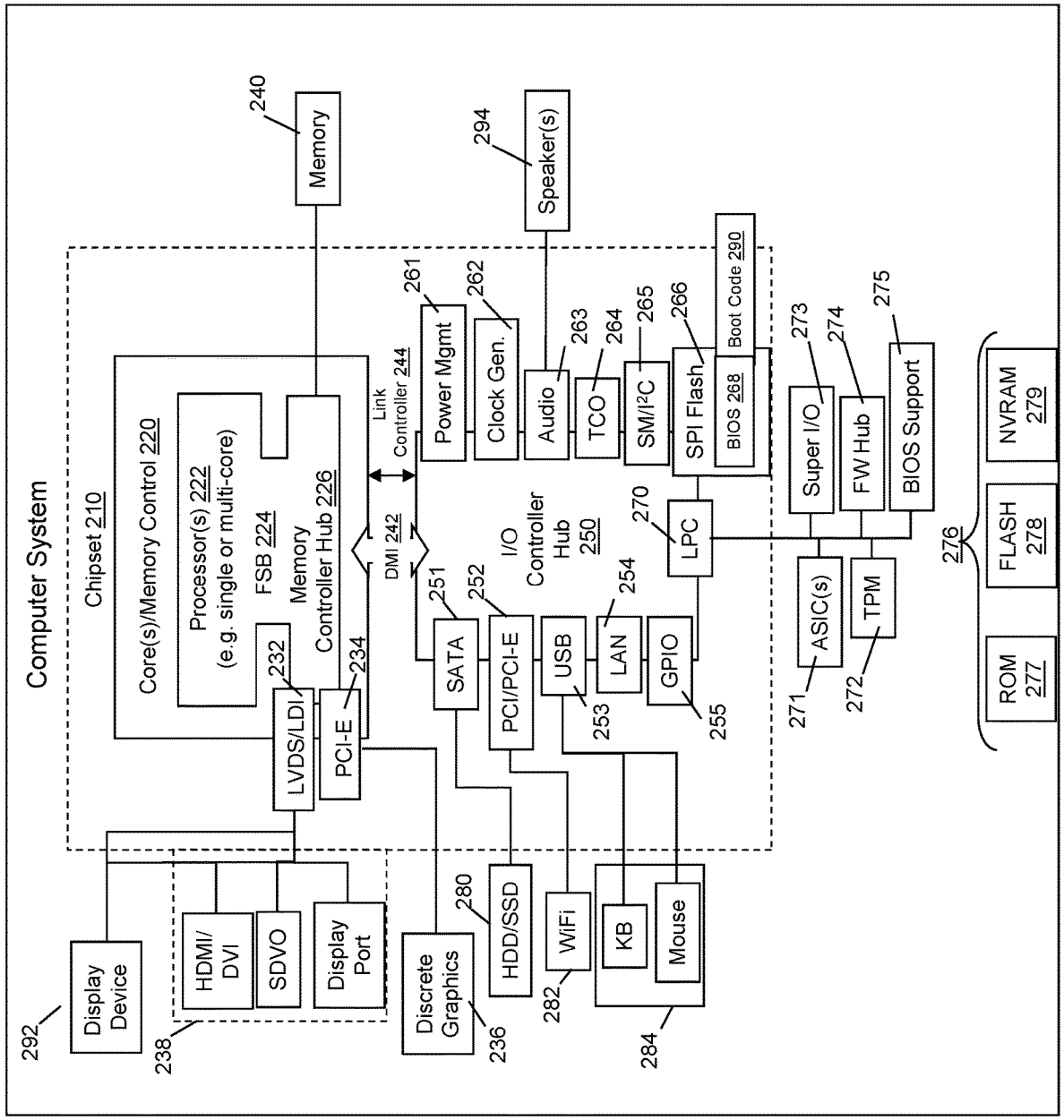
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252

(for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in a system that identifies a location of an information handling device with respect to a physical surface, a system that provides the authentication and increased access to a device, and/or the like. For example, the circuitry outlined in FIG. 1 may be implemented in a tablet or smart phone embodiment, whereas the circuitry outlined in FIG. 2 may be implemented in a personal computer embodiment.

Figure 3:
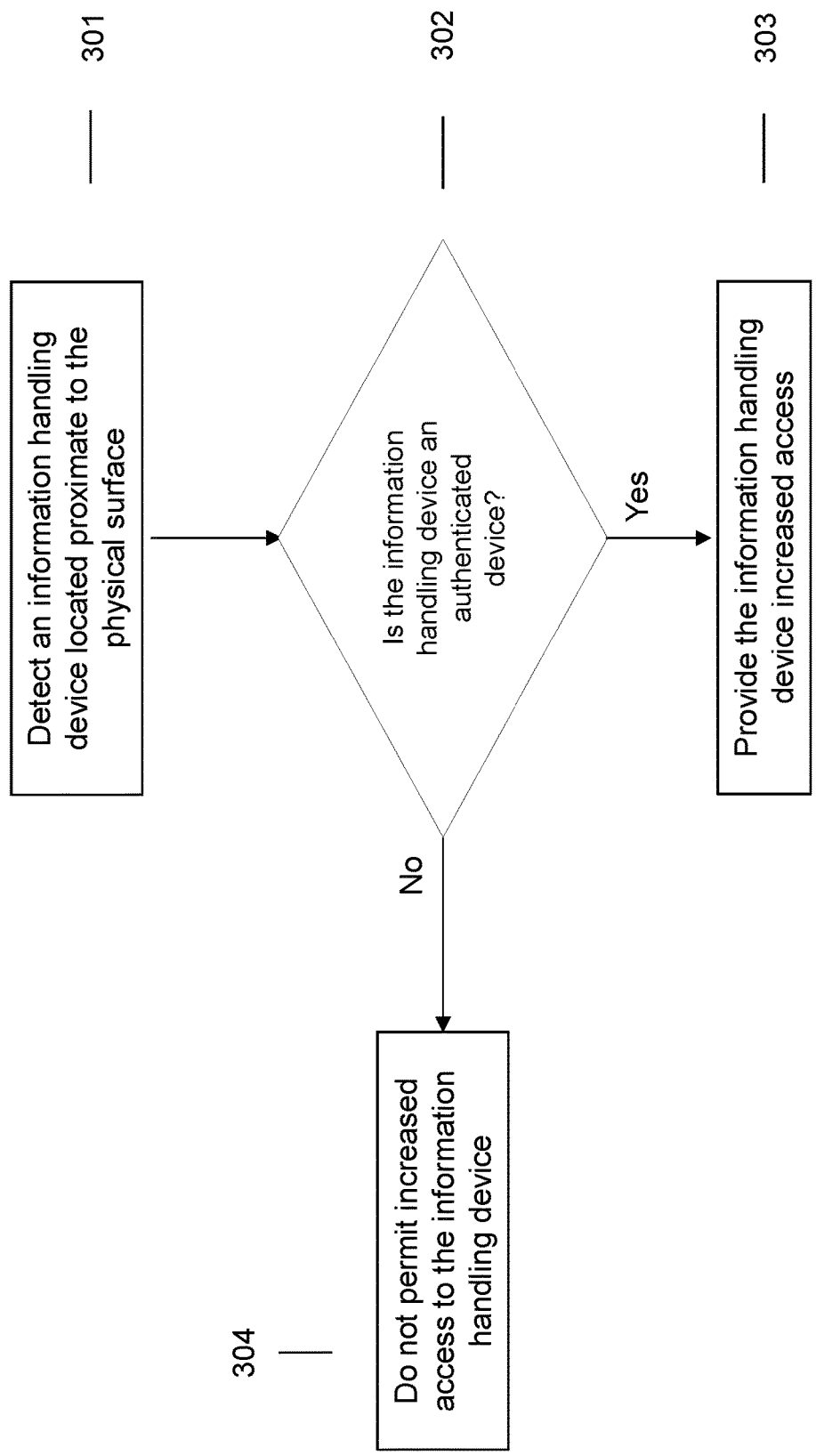
FIG. 3 illustrates an example method for providing an information handling device with increased access by detecting the location of the device on a physical surface and determining the information handling device is an authenticated device.

FIG. 3 illustrates an example method for providing an information handling device with increased access by detecting the location of the device on a physical surface and determining the information handling device is an authenticated device. The method may be implemented on a system which includes a processor, memory device, output devices (e.g., display device, etc.), input devices (e.g., keyboard, touch screen, mouse, microphones, sensors, biometric scanners, etc.), and/or other components, for example, those discussed in connection with FIG. 1 and/or FIG. 2. While the system may include known hardware and software components and/or hardware and software components developed in the future, the authentication system itself is specifically programmed to perform the functions as described herein to provide increased access to an information handling device after determining the information handling device is an authenticated device and is located at a secure location.

The authentication system may run in the background of an information handling device and may be activated when the device is activated. Additionally, or alternatively, the system may be activated when an application or system (e.g., data store, server, etc.) associated with secure data is attempted to be accessed, activated, detected, or otherwise opened. The system may also activate the system upon detecting an information handling device is located proximate to a physical surface with at least one sensor or sensor trigger area. In this case, the authentication system may not be activated until at least one sensor embedded in the physical surface is tripped and/or activated. Lastly, the system may accept manual user input to activate/deactivate the authentication system.

Once the authentication system is activated on a device, the system may be utilized throughout the process of detecting an information handling device located proximate to the physical surface containing at least one sensor, determining the information handling device is an authenticated device based upon a communication between the at least one sensor and the information handling device, and providing increased access to the authenticated information handling device. Continued use of the authentication system when detecting devices on a plurality of surfaces and determining the device is an authenticated device will train the device in accurately providing increased access to correctly authenticated devices. To perform the steps present in authentication system and in order to accurately determine that an information handling device is an authenticated device, the authentication system may utilize a neural network, machine-learning model, and/or other learning algorithm, collectively referred to as a machine-learning model for ease of readability. The machine-learning model can be trained utilizing previously detected information handling devices, sensor detection patterns, and stored communications resulting in increased access for a device. The machine-learning model receives identification of previously authenticated devices and predetermined sensor patterns to further train the machine-learning model. These established devices and detection patterns and methods are referred to as a training dataset.

Using the training dataset, which may change over time, the machine-learning model learns nuances between authenticated and unauthenticated devices, as well as sensor patterns and proximate detection distances from a sensor detection area that resulted in increased access to secure data. This results in more accurately identifying sensor detection patterns and authenticated devices. For example, the machine-learning model can learn when a device is intended to be orientated with the at least one sensor within the physical surface attempting to gain increased access and/or when a device is simply resting on a surface. As secure information access is provided to an authenticated device, the machine-learning model can learn additional nuances and become more accurate and refined over time. Thus, while there is an initial training dataset that is used to initially train the machine-learning model, the machine-learning model is learning over time based upon new information received by the machine-learning model, thereby evolving to become more accurate.

At 301, the authentication system may detect an information handling device is located proximate to a physical surface. In detecting the information handling device, the system may utilize one or more location determination techniques (e.g., near-field communication, global positioning system, short-range communication, wireless network information, etc.) in order to generally or broadly identify a position and/or location of an information handling device. The system may also utilize other location identification or determination techniques, for example, image capture devices to locate a user and/or device within a building or other location, access points that require badging or scanning which can be utilized to identify a last known location of a device and/or user, and/or the like. To detect a position or location of an information handling device with respect to a physical surface (e.g., desk, workstation, table, kiosk, wall, door, chair, designated physical surface, etc.), the system may further utilize at least one sensor that is located within the physical surface. It should be noted that the system may utilize the sensor(s) located in the physical surface to supplement or refine the general or broad location previously identified for the user and/or the device, or may use the sensor(s) located in the physical surface individually or instead of the general or broad location information.

A physical surface may include at least one sensor embedded within the physical surface, meaning that the sensor(s) is not obvious by a person viewing the physical surface. Thus, knowledge of the location of the sensor(s) in a physical surface acts as a layer of security for the system. However, this is not strictly necessary and the sensor(s) may be viewable in some applications. Additionally, or alternatively, the sensor(s) may be located on a backside or underside of a physical surface, depending on the physical surface characteristics. These sensor(s) may be of a type that permit the transmitting of sensor data through the entire physical surface. In this system, the sensors may not need to be embedded into the physical surface, allowing for retroactive installment, but still obfuscating the sensor(s) locations from a person generally viewing the physical surface, thereby maintaining some extra level of security.

The sensor(s) located within a physical surface, which also refers to those sensors that are located on the physical surface and not embedded within the physical surface, allow the authentication system to determine a location or position of a device on the physical surface or with respect to the physical surface. However, in order to allow some slack in the positioning of the device on or with respect to the physical surface, the sensors may be associated with a sensor trigger area. The sensor trigger area is a position on the physical surface that corresponds to an area of acceptance or detection for the sensor. In other words, a device correctly located within the sensor trigger area would result in a match or acceptance of the device, even if the device is not located directly over the exact location of the sensor itself. Commonly a circular shape, as can be seen in FIG. 4, a sensor trigger area may include a threshold radial distance from a center of the sensor when determining if an information handling device is located proximate to a physical surface at 301.

In the system, the threshold radial distance, or threshold distance in the case of a non-circular threshold area, of a sensor may be customized to the application or use case. For example, the threshold radial distance may be a few inches (this would generally be identified as a large threshold value), or the threshold radial distance of a sensor of a physical surface may be a few millimeters (this would generally be identified as a small threshold value). The threshold distance may be configurable by a user or entity based upon security needs. Additionally, the shape of the threshold area may be configurable. For example, an entity may desire a cone-shaped threshold area, a square-shaped threshold area, an irregular-shaped threshold area, and/or the like. Shapes and distances may also be based upon the physical surface being utilized. For example, in a desk or table, the threshold distance may end at the edge of the desk or table, which may result in the opposing side of the threshold area having a greater distance than the edge-side of the threshold area.

A physical surface may include a plurality of sensors located in different locations within, including attached to, the physical surface. The locations of the plurality of sensors may be configured so that a single information handling device can trigger all the sensors at the same time, if the device is located in a correct position and/or orientation on or proximate to the physical surface. For example, a physical surface may contain three separate sensors, and therefore, three separate sensor trigger areas. When an information handling device is positioned on or proximate to the physical surface in a position and/or orientation that aligns the appropriate sensors of the device to the corresponding sensors of the physical surface, the system identifies the device as being correctly positioned proximate to the physical surface. Alternatively, incorrect orientation of the device with respect to the sensor trigger areas may result in denial of continued use of the system, because the position of the sensors of the information handling device are not aligned with the sensor trigger areas. As mentioned above, depending on the threshold area of the sensor trigger areas, the device may not need to be precisely located on or proximate to the physical surface with respect to the center of the physical surface sensor(s).

When detecting an information handling device located proximate to the physical surface, at 301, the system may recognize previously mated sensors between the sensors present in the physical surface and at least one sensor present on an information handling device. The information handling device sensors may be sensors that are generally standard to information handling devices or types of information handling devices, for example, near-field communication sensors, proximity sensors, capacitive sensors, and/or the like. The type of sensor may be based upon the type of device that is being utilized, for example, a mobile phone may include capacitive sensors, but a laptop computer may not. The information handling device sensors may also be sensors that are specifically installed on the device for the authentication or security system described. It should also be noted that either the sensor(s) present in the physical surface or the sensor(s) of the information handling device may include passive sensors, also referred to as passive emitters. Thus, the mated pair may include a sensor and a passive emitter, where the passive emitter can either be on the physical surface or the information handling device.

Previously mating the sensor(s) of the physical surface to the sensor(s) of the information handling device may assist with subsequently determining if the information handling device is an authenticated device, at 304. However, prior to authenticating, the system may mate the corresponding sensors in order to accurately detect a position of the information to the physical surface at 301. Mating the sensor(s) of the physical surface and the sensor(s) of the information handling device indicates a relationship allowing for access and communication between the sensors of the surface and device has been established. In other words, mating the sensors means that, upon recognition of the sensors counterpart (e.g., the previously mated sensor), the system will recognize the device as a previously authenticated or trusted device. The mating may occur upon system setup, may be designated by an entity (e.g., mated sensors are identified in a datastore, trusted devices and corresponding sensors are identified is a datastore, etc.), may occur upon detection of a new device, and/or the like. Alternatively, if the sensor of a physical surface and the sensor of the information handling device are not previously mated, subsequent authentication and accessing of secure data may be denied or the device may have to undergo additional authentication before being granted increased access.

In the system, detecting an information handling device, at 301, may be responsive to receiving a request to access confidential information. The authentication system may recognize that a request to access confidential information is present. Upon detection of this request, the authentication system may start accepting transmitted sensor data until the system is able to determine that the information handling device is proximate to the physical surface. In other words, such a confidential or secure information access request to access confidential information may act as an initiation of the authentication system. On the other hand, the authentication system may continually monitor, monitor at predetermined intervals, monitor upon receipt of a predetermined trigger event, and/or the like, the sensor(s) for transmissions.

After detecting a device is located proximate to the physical surface, at 301, the system may determine if the information handling device is an authenticated device at 302. The system may determine if the device is an authenticated device based upon a communication between the sensor(s) of the physical surface and the sensor(s) of the information handling device. This communication between sensors may be used to determine if the sensor of the physical surface and the sensor of the device have been previously mated, if the device is located or positioned at a particular location on or proximate to the physical surface, if the device is located or positioned in a particular orientation on or proximate to the physical surface, and/or the like. Incorrect orientation of the device about a surface in relation to the at least one sensor trigger area will result in a denied increase in access to the device. However, when the information handling device is correctly positioned at a particular location on the physical surface, the system may authenticate the information handling device in use.

When determining, at 302, if the information handling device is an authenticated device, the system may determine if the current device (i.e., the device attempting to gain increased access) is one of a plurality of previously authenticated devices. Previously authenticated devices may include devices that have previously been granted increased access, devices that have been identified as authenticated devices within a datastore, devices that correctly establish authentication using secondary authentication techniques, devices having previously mated sensors, and/or the like. Thus, determining a device is an authenticated device may include determining if the device is located at a particular location or orientation proximate to the physical surface. Additionally, but not required, determining a device is an authenticated device may include determining the device is authorized to have increased access, which may include determining if the device or user of the device has increased access clearance, determining the level of access assigned to the device, if the device is included within an authorized device datastore, and/or the like.

In some applications, not all sensors of the physical surface may be activated or triggered each time a device is located proximate to the surface. Which sensors that are activated may be random, which may help increase the security of the system. Thus, when identifying authenticated devices, the system may utilize historical information regarding sensors that were triggered based upon devices and/or device types and how device sensors interacted with the triggered sensors to generate triggered sensor patterns and authentication devices. Reuse of exact sensor patterns at some frequency may be reduced in order to reduce a risk of compromising secure data. However, reference to previously successful pairings and sensor patterns may be utilized when mating new sensors to establish a relationship for authentication.

When it is determined, at 302, that the information handling device is not an authenticated device, the system does not permit increased access to the information handling device, at 304. In the system, the non-authenticated information handling device may be a device that does not contain the appropriate sensors and/or activate an expected sensor pattern. For example, the non-authenticated information handling device may be a device that is orientated incorrectly on the physical surface. As another example, the non-authenticated device may be a device that is not stored in the authentication system, for example, as an authorized device.

On the other hand, when it is determined that the information handling device is an authenticated device, at 302, the system may provide the information handling device increased access, at 303. Providing the information handling device with increased access may be provided by a central control system. In this case, the location data of the device (e.g., the proximate location of the device with respect to the surface, the general or broad location of the device, etc.), will be provided to the central control system and the central control system performs the authenticating and provides the increased access. Regardless of whether a central control system is utilized or not, providing the information handling device with increased access may include producing an authentication token. The authentication token establishes that the device has been authenticated and permits increased access to secure data. Increased access may include access to databases with sensitive information, access to applications or application portions not allowed without increased access, access to physical locations requiring additional security, and/or the like.

In some applications, each sensor that is triggered may produce its own authentication token. As previously mentioned, a physical surface may include a plurality of sensor in different locations within the physical surface that may correspond to a plurality of sensor trigger areas. Each of these sensor trigger areas may produce separate authentication tokens. The number of authentication tokens produced may be based upon not only the location and/or orientation of the device proximate to the surface, but may also be based upon a level of access assigned to the device. A minimum number of tokens needed for authentication, what functions or access certain authentication tokens provide, and/or the like, can be configured for an application or by an entity.

Multiple tokens can be utilized in different ways depending on the application. In one example, the device may have to trigger enough sensor trigger areas to produce a threshold number of tokens in order to be authenticated and receive increased access. As another example, an increasing number of authentication tokens may result in increase levels of access. For example, a single authentication token may result in access to a read-only database, two authentication tokens may result in access to write to the database, and so on. As another example, a single authentication token may result in access to a database, two authentication tokens may result in access to the database and an application, and so on.

In another multiple token use example, each token may allow access to separate portions of secure data. For example, the plurality of sensors within the physical surface may be independently mated with a sensor of an information handling device, and based upon the pattern of the mated sensors, increased access to separate portions of the information handling device, application in use, secure data, and/or the like, may be permitted. For example, if there are four sensors present within a physical surface, and an information handling device is previously mated with three of the four sensors, upon detection of the sensors of the information handling device at the sensor trigger areas of the physical surface, increased access may be provided to the device corresponding to the three mated sensors. For example, an information handling device with sensors mated to sensor trigger areas one, two, and three may receive increased access to a secure database, whereas, an information handling device with sensors mated to sensor trigger areas one, two, and four may receive increased access to portions of an application. Thus, the orientation of the information handling device in regards to the at least one sensor mated with the at least one sensor of the physical surface is highly important when attempting to operate the information handling device under an authentication token.

The information handling device receiving increased access may be permitted to operate with this increased access while the device remains in the correct orientation on the physical surface. In other words, that device may be authenticated and remain authenticated for as long as the device remains aligned with the sensor(s) of the surface. Once the device is moved from this position, increased access for the device may be removed. Additionally, when the authentication token is produced, a geolocation secondary token may also be supplied to the system. The geolocation secondary token may determine the position of the device while operating under the authentication token. The geolocation secondary token may remain intact while the device is present in a correct orientation at the physical surface, but upon moving the device, the geolocation secondary token may communicate with the authentication system that a device has been moved, and therefore, the system may remove the increased access for the device.

Additionally, or alternatively, the information handling device receiving increased access may receive an authentication token or tokens subsequent to being authenticated, and the authentication token(s) may remain active for the information handling device for a predetermined amount of time. If the predetermined amount of time is used in conjunction with the position of the device proximate to the surface, increased access to the device may be removed if the device is moved or if the token times out, whichever occurs first. If, on the other hand, the predetermined amount of time is used separately from the position of the device proximate to the surface, once the device is authenticated based upon the position of the device proximate to the surface, the device may have continued increased access for a predetermined amount of time regardless of the position of the device. In other words, after receiving an authentication token, the information handling device may be removed from a physical surface containing the at least one sensor, and operate with increased access until the token times out. The predetermined amount of time of increased access for the device with an authentication token may be configurable, a default value, be based upon a security level or clearance level of the device and/or user of the device, and/or the like. Utilizing the predetermined amount of time separately from the position of the device proximate to the surface may be useful in an application where the described type of authentication is used to gain increased access to or moving about secure locations, and/or the like.

The previously mentioned geolocation secondary token may also track a location of a user while operating a device under an authentication token. When a user is able to move away from the physical surface after being authenticated, the geolocation secondary token may record where a user is utilizing the increased access of the device. This geolocation secondary device may utilize general or broad location tracking techniques as previously mentioned. The geolocation secondary token may further limit where a device with increased access may operate. For example, if a user device has been authenticated to access data labeled with a high security and is in a busy and/or public setting, communication from the geolocation secondary token to the authentication system may instruct the system to not permit access to the data with a high security because of a likelihood of potentially compromising the data. The system may determine appropriate and inappropriate locations for utilizing a device with increased access while operating under an authentication token.

The authentication token produced may be saved in accessible storage device, utilized in training a machine-learning system in the authentication system, and may further influence the production of sensor mating and relationship communication between sensors, and the like. Storing the authentication token may include storing specifics surrounding the increased access provided to the device, a time stamp of device authentication, the type of device, how long the device utilized the increased access, information that was access with the increased access, and/or the like. Additionally, storing the authentication token may also include storing the geolocation secondary token, if produced and/or utilized, and location information associated with the device, including, positions of a device while operating under an authentication token, permitted areas of increased access of the information handling device, restricted areas of increased access of the information handling device, and/or the like.

Referring to FIG. 4A-C, the figures illustrate an example system configuration and the importance of a location of a device in relation to the sensor trigger areas present within a surface. In FIG. 4A, an illustration depicting a physical surface 404 is provided with sensor trigger areas 401 being present within the physical surface area. As mentioned previously, the sensor trigger areas 401 are associated with the at least one sensor embedded within, present on the non-viewable side of, or viewable on the physical surface 404. The sensor trigger areas 401 are associated with the position of the at least one sensor. As can be seen in this example illustration, there are three (3) sensor trigger areas 401 present in the physical surface 404.

Moving to FIG. 4B, the example includes a device 403 and the depicts the position of the at least one, in this example, three, sensors 402 coupled to the information handling device 403. In this figure, the device 403, and more particularly the sensors 402 of the device 403, are not aligned with the sensor trigger areas 401 of the physical surface 404. At this instance, the device 403 will not be authenticated by the system, and therefore will not receive increased access. Rather, at this instance, device 403 will operate at a traditional level. In FIG. 4C, upon orientating device 403, but more specifically aligning the device sensors 402 with the sensor trigger areas 401 (and ultimately the sensors of the physical surface 404), the authentication system may determine that the device is an authenticated device 403, and permit increased access to the device 403. In some applications, if the sensors were not previously mated, the device 403, even in the correct orientation, will not be authenticated by the system.

The various embodiments herein thus describe a technical improvement over conventional methods for authenticating a device and thereafter permitting increased access to the authenticated device. An information handling device may be detected as proximate to a physical surface containing at least one sensor, and subsequent to determining from a communication between the at least one sensor of the physical surface and at least one sensor coupled to the information handling device, the system may authenticate a device. Upon authenticating the device based upon a position of the device on the physical surface, the system may increase a level of access for the device, thereby permitting viewing and/or utilizing secure data, information, applications, and/or the like. Thus, this system provides improvements over traditional authentication methods that utilize a broad location determination for authenticating a device and further assists in ensuring that secure data does not become compromised.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, utilizing at least one sensor located within a physical surface, an information handling device located proximate to the physical surface, wherein the at least one sensor comprises a plurality of sensors in different locations within the physical surface;
   determining, based upon a communication of the at least one sensor to the information handling device responsive to the detecting, the information handling device is an authenticated device, wherein the determining comprises determining, based upon communication of the plurality of sensors with the information handling device, the information handling device is positioned at a particular location on the physical surface; and
   providing, responsive to the determining the information handling device is an authenticated device, the information handling device increased access, wherein the providing comprises authenticating the information handling device in response to detecting the information handling device is positioned at the particular location.

2. The method of claim 1, wherein the at least one sensor is previously mated with at least one sensor of the information handling device.

3. The method of claim 2, wherein one of the at least one sensor and the at least one sensor of the information handling device comprises a passive emitter.

4. The method of claim 1, wherein the providing comprises producing an authentication token in response to the determining.

5. The method of claim 4, wherein the authentication token comprises a geolocation secondary token.

6. The method of claim 1, wherein the determining comprises determining the information handling device is one of a plurality of predetermined authenticated devices.

7. The method of claim 1, wherein the determining comprises reporting location data of the information handling device identified based on the detecting to an authentication system, wherein the authentication system performs the providing.

8. The method of claim 1, wherein the providing comprises authorizing the information handling device to access confidential information associated with the physical surface.

9. The method of claim 1, wherein the detecting is responsive to receiving a request to access confidential information.

10. A system, the system comprising:
a processor;
at least one sensor located within a physical surface;
a memory device that stores instructions that when executed by the processor, causes the system to:
detect, utilizing the at least one sensor, an information handling device located proximate to the physical surface, wherein the at least one sensor comprises a plurality of sensors in different locations within the physical surface;
determine, based upon a communication of the at least one sensor to the information handling device responsive to the detecting, the information handling device is an authenticated device, wherein to determine comprises: determining, based upon communication of the plurality of sensors with the information handling device, the information handling device is positioned at a particular location on the physical surface; and
provide, responsive to the determining the information handling device is an authenticated device, the information handling device increased access, wherein to provide comprises authenticating the information handling device in response to detecting the information handling device is positioned at the particular location.

11. The system of claim 10, wherein the at least one sensor is previously mated with at least one sensor of the information handling device.

12. The system of claim 11, wherein one of the at least one sensor and the at least one sensor of the information handling device comprises a passive emitter.

13. The system of claim 10, wherein to provide comprises producing an authentication token in response to the determining.

14. The system of claim 13, wherein the authentication token comprises a geolocation secondary token.

15. The system of claim 10, wherein to determine comprises determining the information handling device is one of a plurality of predetermined authenticated devices.

16. The system of claim 10, wherein to determine comprises reporting location data of the information handling device identified based on the detecting to an authentication system, wherein the authentication system performs the providing.

17. The system of claim 10, wherein to provide comprises authorizing the information handling device to access confidential information associated with the physical surface.

18. A product, the product comprising:
a computer-readable storage device that stores executable code that, when executed by a processor, causes the product to:
detect, utilizing at least one sensor located within a physical surface, an information handling device located proximate to the physical surface, wherein the at least one sensor comprises a plurality of sensors in different locations within the physical surface;
determine, based upon a communication of the at least one sensor to the information handling device responsive to the detecting, the information handling device is an authenticated device, wherein to determine comprises: determining, based upon communication of the plurality of sensors with the information handling device, the information handling device is positioned at a particular location on the physical surface; and
provide, responsive to the determining the information handling device is an authenticated device, the information handling device increased access, wherein to provide comprises authenticating the information handling device in response to detecting the information handling device is positioned at the particular location.

19. The method of claim 1, wherein the at least one sensor located within the physical surface comprises a location that is not obvious to a person viewing the physical surface.

20. The system of claim 1, wherein the at least one sensor located within the physical surface permits transmitting sensor data through the physical surface.

\* \* \* \* \*